United States Patent
Langdon, II et al.

(10) Patent No.: US 8,549,864 B2
(45) Date of Patent: Oct. 8, 2013

(54) TEMPERATURE ACTIVATED VALVES FOR GAS TURBINES

(75) Inventors: Richard Henry Langdon, II, Simpsonville, SC (US); Gary Charles Liotta, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 946 days.

(21) Appl. No.: 12/683,787

(22) Filed: Jan. 7, 2010

(65) Prior Publication Data

US 2011/0162384 A1 Jul. 7, 2011

(51) Int. Cl.
*F02C 7/18* (2006.01)
*F02C 6/08* (2006.01)

(52) U.S. Cl.
USPC ............... 60/782; 60/785; 251/11; 415/116

(58) Field of Classification Search
USPC ............... 60/782, 785, 806, 39.23; 137/468; 251/11; 415/47, 49–50, 115–116; 416/39, 416/95, 96 A, 96 R, 97 R
See application file for complete search history.

(56) References Cited

U.S. PATENT DOCUMENTS

| | | | | |
|---|---|---|---|---|
| 2,787,440 | A | * | 4/1957 | Thompson, Jr. ............... 415/12 |
| 3,575,528 | A | * | 4/1971 | Beam et al. ................... 416/39 |
| 4,213,738 | A | * | 7/1980 | Williams ....................... 416/95 |
| 4,217,755 | A | * | 8/1980 | Williams ....................... 60/806 |
| 4,296,599 | A | | 10/1981 | Adamson |
| 4,427,149 | A | | 1/1984 | Adachi |
| 4,485,842 | A | | 12/1984 | Rausch |
| 4,560,105 | A | | 12/1985 | Jiandani |
| 4,807,433 | A | * | 2/1989 | Maclin et al. ................ 60/795 |
| 5,022,817 | A | | 6/1991 | O'Halloran |
| 5,263,643 | A | | 11/1993 | Wells et al. |
| 5,996,331 | A | * | 12/1999 | Palmer .......................... 60/782 |
| 6,116,852 | A | * | 9/2000 | Pierre et al. .................. 415/115 |
| 7,258,524 | B2 | * | 8/2007 | Friedel et al. ................ 415/115 |
| 7,445,424 | B1 | | 11/2008 | Ebert et al. |

* cited by examiner

*Primary Examiner* — William H Rodriguez
*Assistant Examiner* — Carlos A Rivera
(74) *Attorney, Agent, or Firm* — Dority & Manning, P.A.

(57) ABSTRACT

A system for modulating the amount of air supplied through a pressure boundary in a gas turbine is disclosed that includes a passageway located on the pressure boundary. Additionally, a temperature activated valve is mounted within the passageway and is configured to activate at a predetermined temperature threshold. Specifically, the temperature activated valve activates from a closed position to an open position when the local temperature at the temperature activated valve reaches or exceeds the predetermined temperature threshold to allow air to flow through the passageway.

19 Claims, 7 Drawing Sheets

TEMPERATURE ACTIVATED VALVES FOR GAS TURBINES

FIELD OF THE INVENTION

The subject matter disclosed herein relates generally to gas turbines, and particularly to a system for relieving areas of high temperature in a gas turbine. More particularly, the present subject matter relates to temperature activated valves for installation in a gas turbine for selectively flowing air to areas of high temperature.

BACKGROUND OF THE INVENTION

Gas turbines are widely used in commercial operations for power generation. A conventional gas turbine includes a plurality of combustors disposed around an annular array about the axis of the engine. A compressor supplies compressed air to each combustor, wherein the compressed air and fuel are mixed and burned. Hot gases of combustion flow from each combustor to the turbine section of the engine wherein energy is extracted from the combustion gases to produce work.

It is widely known that the thermodynamic efficiency of a gas turbine increases as the operating temperature, namely the combustion gas temperature, increases. Higher temperature combustion gases contain more energy and produce more work as the combustion gases expand in the turbine. However, as temperatures have been increased to improve the efficiency of gas turbines, it has become necessary to provide cooling air to the turbine components in order to maintain the temperatures of such components at acceptable levels. Thus, at higher operating condition temperatures, the amount of cooling air that is required is relatively high. In contrast, during lower temperature operating conditions, less cooling air is required for certain turbine components. Moreover, the amount of cooling required can vary from engine-to-engine, for example, due to first stage bucket leakage, hot gas ingestion, or surrounding environmental conditions.

In spite of these differing operating conditions and engine-to-engine variations, the prior art has not generally provided a system that modulates the flow of air delivered to the turbine components. As a result, since the engine must be designed to provide for maximum temperature operation, an excessive amount of cooling air is provided during lower temperature operation, which tends to reduce the efficiency of the engine during such operating periods.

Accordingly, there is a need for a system in a gas turbine that provides cooling air to turbine components only as needed, for example during higher temperature operation. Such a system would lead to improved efficiency and increased output during lower temperature operation without compromising turbine components during higher temperature operation.

BRIEF DESCRIPTION OF THE INVENTION

Aspects and advantages of the present subject matter will be set forth in part in the following description, or may be obvious from the description, or may be learned through practice of the present subject matter.

In one aspect, the present subject matter provides a system for modulating the amount of air supplied through a pressure boundary in a gas turbine that includes a passageway located on the pressure boundary and a temperature activated valve mounted within the passageway. The temperature activated valve is configured to activate at a predetermined temperature threshold. Specifically, the temperature activated valve activates from a closed position to an open position when the local temperature at the temperature activated valve reaches or exceeds the predetermined temperature threshold to allow cooling air to flow through the passageway.

In another aspect, the present subject matter provides a system for modulating the amount of cooling air and anti-ingestion air supplied through a pressure boundary in a gas turbine that includes at least one temperature activated thermal valve, a plurality of temperature activated anti-ingestion valves and a plurality of passageways located on a pressured boundary in the gas turbine. The thermal valve is mounted within one of the passageways and is configured to activate at a predetermined temperature threshold. Specifically, the thermal valve is normally in a closed position and activates to an open position based on the local temperature at the thermal valve to allow cooling air to flow through the passageway. Additionally, the anti-ingestion valves are mounted within the remaining passageways, one anti-ingestion valve in each passageway, and are configured to activate at increasing predetermined temperature thresholds. Each anti-ingestion valve is initially in a closed position and permanently activates to an open position based on the local temperature at each anti-ingestion valve to allow anti-ingestion air to flow through the passageway(s).

These and other features, aspects and advantages of the present subject matter will become better understood with reference to the following description and appended claims. The accompanying drawings, which are incorporated in and constitute a part of this specification, illustrate embodiments of present subject matter and, together with the description, serve to explain the principles of the present subject matter.

BRIEF DESCRIPTION OF THE DRAWING

A full and enabling disclosure of the present subject matter, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the present subject matter, one or more examples of which are illustrated in the drawings. Each example is provided by way of explanation and not limitation of the present subject matter. In fact, it will be apparent to those skilled in the art that various modifications and variations can be made in the present subject matter without departing from the scope or spirit of the present subject matter. For instance, features illustrated or described as part of one embodiment, can be used with another embodiment to yield a still further embodiment. Thus, it is intended that the present subject mater covers such modifications and variations as come within the scope of the appended claims and their equivalents.

Figure 1:
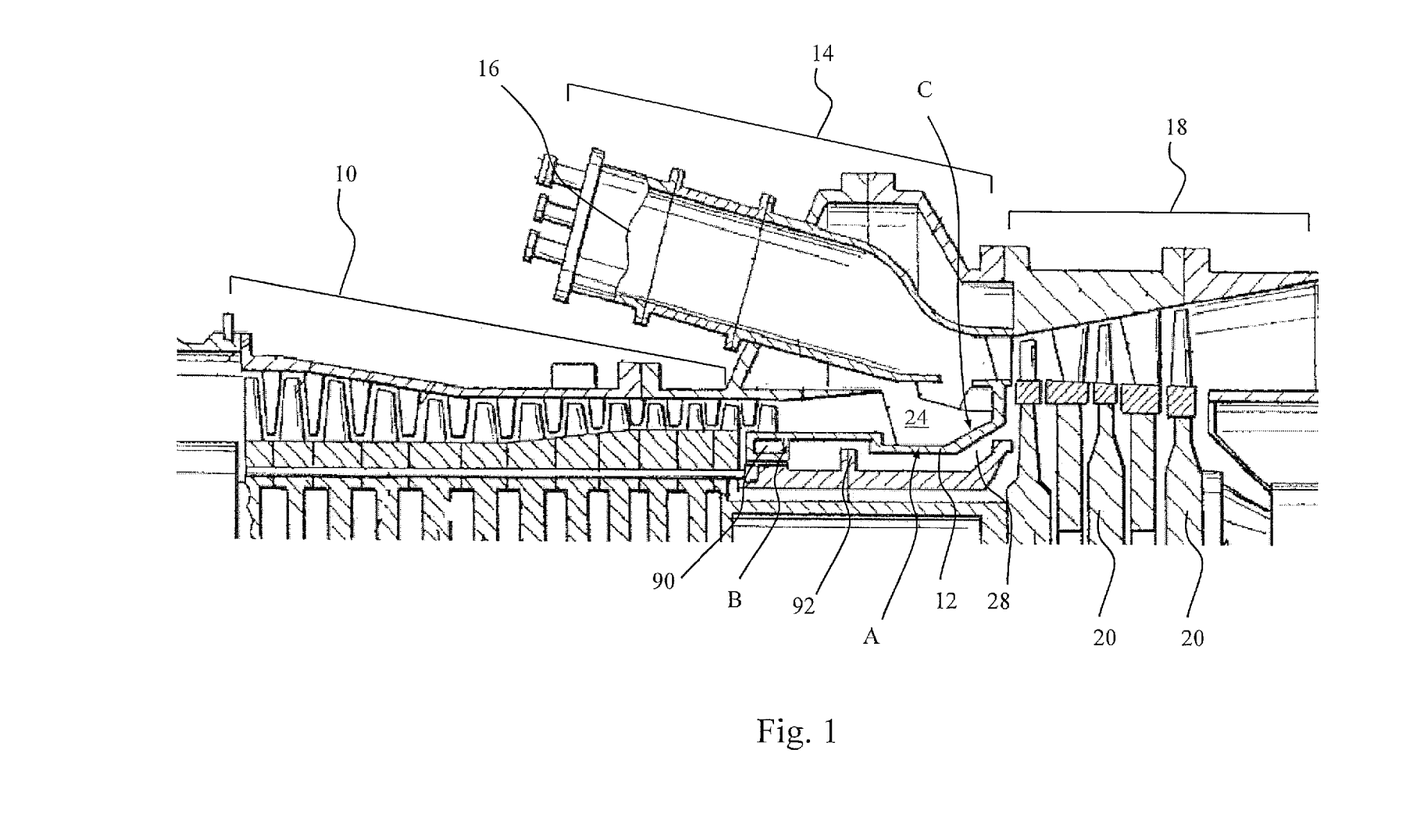
FIG. 1 provides a cross-sectional view of a portion of a gas turbine.

A cross-sectional view of a portion of a gas turbine is illustrated in FIG. 1. Pressurized air discharged from the compressor section 10 flows through a plenum 24 formed by the compressor discharge case 12 and into to the combustion section 14, generally characterized by a plurality of combustors 16 disposed around an annular array about the axis of the engine (only one of which is illustrated in FIG. 1). As is generally understood, compressor discharge air constitutes the highest pressure air flowing within a gas turbine. The pressurized air is mixed with fuel within each combustor 16 and burned. The hot gases of combustion flow from the combustion section 14 into the turbine section 18 to drive the turbine and generate power. The turbine section 18 includes a plurality of rotor wheels 20 comprising the turbine rotor, with each rotor wheel 20 mounted to the rotor shaft for rotation therewith.

Numerous pressure boundaries exist within the different sections of a gas turbine. As used herein, the term pressure boundary refers to any location wherein the pressure on one side of a stationary structure is greater than the pressure on the opposing side of such structure. These pressure boundaries also typically define locations across which significant temperature variations exist. As a result, it is common to locate passageways or holes, such as dilution holes or bore holes, along such pressure boundaries to allow cooler, highly pressurized air to flow into and quench higher temperature, lower pressure areas.

For example, as shown in FIG. 1, pressurized air flowing within the plenum 24 creates a pressure boundary defined by the compressor discharge case 12 between the plenum 24 and the forward wheel space 28. A bore hole (not illustrated) is often provided on this pressure boundary, for example at position A, to allow a constant flow of the high pressure, cooler compressor discharge air to enter the forward wheel space 28 to relieve high temperatures and to cool turbine components. However, the operating temperatures within the forward wheel space 28 can vary significantly as a result of differing operating condition temperatures and expected engine-to-engine variations, such as the amount of stage one bucket leakage or hot gas ingestion. As such, the bore hole must be configured to provide sufficient cooling air during maximum operating temperatures. This leads to an excessive amount of cooling air entering the forward wheel space 28 during cooler operating temperature, resulting in reduced engine outputs. To address this issue, a system, as described below in greater detail, can be implemented along such pressure boundaries to provide cooling air only as needed to maintain engine outputs during cooler operating temperatures.

Figure 2:
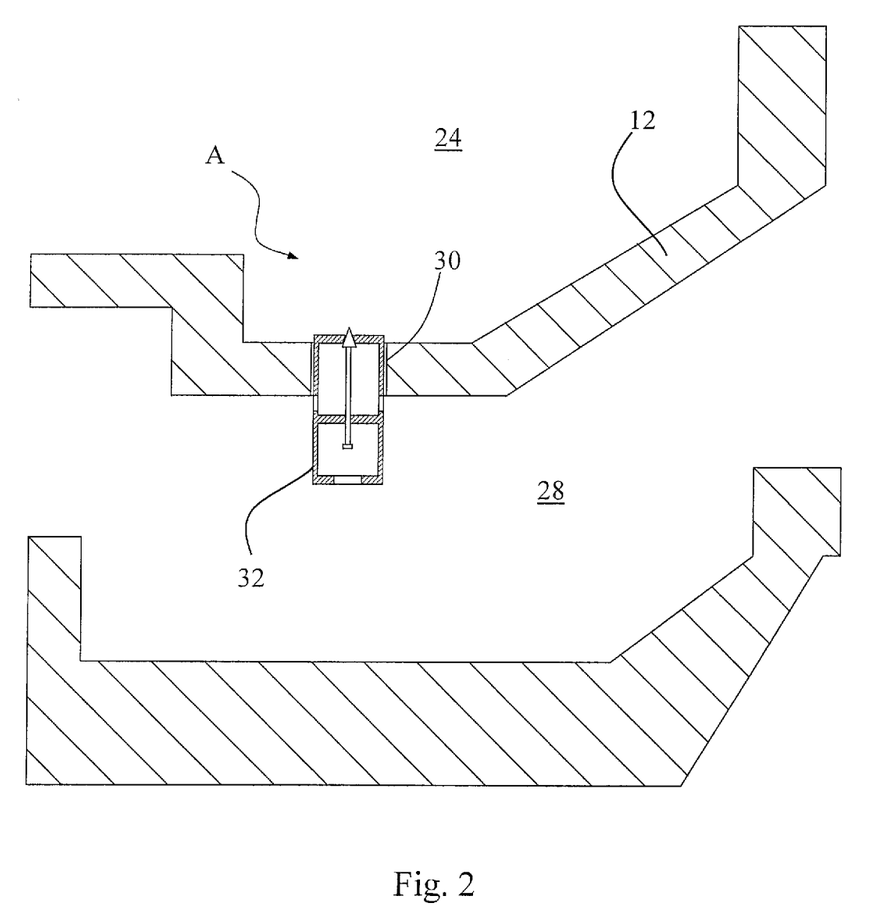
FIG. 2 provides a cross-sectional view of an embodiment of a system for modulating the amount of air flowing through a pressure boundary in accordance with an aspect of the present subject matter.

In accordance with one aspect of the present subject matter, FIG. 2 illustrates an embodiment of a system for modulating the amount of cooling air supplied through a pressure boundary in a gas turbine. The system includes a thermal valve passageway 30 located on a pressure boundary in a gas turbine. As used herein, the term "passageway" refers to any through hole that runs from one side of a pressure boundary to another. Thus, for example, the term "passageway" would include a bore hole drilled through a pressure boundary or a pre-fabricated hole that is formed through a pressure boundary.

As illustrated, the passageway 30 is located at position A (FIG. 1) on the pressure boundary defined by the compressor discharge case 12. It should be appreciated by one of ordinary skill in that art, however, that the passageway 30 could be located at any point along such pressure boundary or on any other pressure boundary within the gas turbine. Additionally, it should be appreciated that there could be numerous thermal valve passageways located on a pressure boundary.

The system also includes a temperature activated thermal valve 32 mounted within the passageway 30. The thermal valve 32 can be mounted within the passageway 30 by any method. For example, the thermal valve 32 could be press-fit into the passageway 30 or both the thermal valve 32 and the passageway 30 could be threaded to allow the thermal valve 32 to be mounted within the passageway 30.

As will be discussed in more detail below, the thermal valve 32 may be normally in a closed position and can be configured to activate to an open position at a predetermined temperature threshold based on the local temperature at the thermal valve 32. Once open, the thermal valve 32 allows cooling air to flow through the passageway 30 to a high temperature area. Thus, in the illustrated embodiment, the thermal valve 32 can be configured to activate to an open position when the temperature of the forward wheel space 28, near position A, reaches a predetermined temperature threshold. This permits higher pressure, cooler temperature air deriving from the compressor 10 to flow through the passageway 30 to quench the wheel space temperature and cool turbine components.

It should be readily appreciated that the predetermined temperature threshold at which the thermal valve 32 is configured to activate will vary depending on numerous factors. The temperature threshold may depend on the estimated operating condition temperatures for a particular turbine engine, the temperature ranges generally expected at a particular pressure boundary, or other varying engine conditions. In the illustrated embodiment, for example, the predetermined temperature threshold may depend on the above mentioned factors, as well the amount of hot gas ingestion within the forward wheel space 28 and the properties of the materials used in manufacturing the adjacent turbine components, such as the rotor wheels 20 (FIG. 1). Once an appropriate temperature threshold is calculated, the thermal valve 32 can be configured to activate open at that temperature threshold.

It should also be appreciated that the thermal valve 32 may be any type of temperature activated valve generally known to those of ordinary skill in the art. As used herein, the term "temperature activated valve" refers to any valve that activates or actuates due to temperature activated elements located within the valve. Thus, a temperature activated valve activates due to its own internal components. Accordingly, the term "temperature activated valve" would not include a valve connected to a sensor or other sensing device that activates or actuates due to externally (outside the valve) sensed temperatures or other parameters from the sensor or sensing device.

Figure 3:
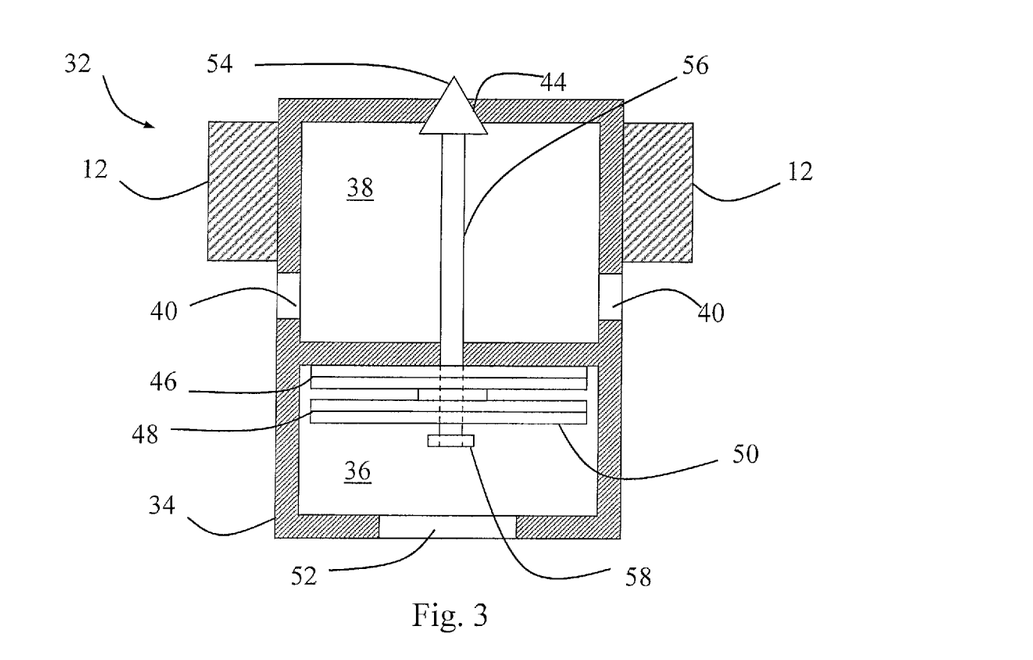
FIG. 3 provides a cross-sectional view of one embodiment of a temperature activated valve in a closed position in accordance with an aspect of the present subject matter.
Figure 4:
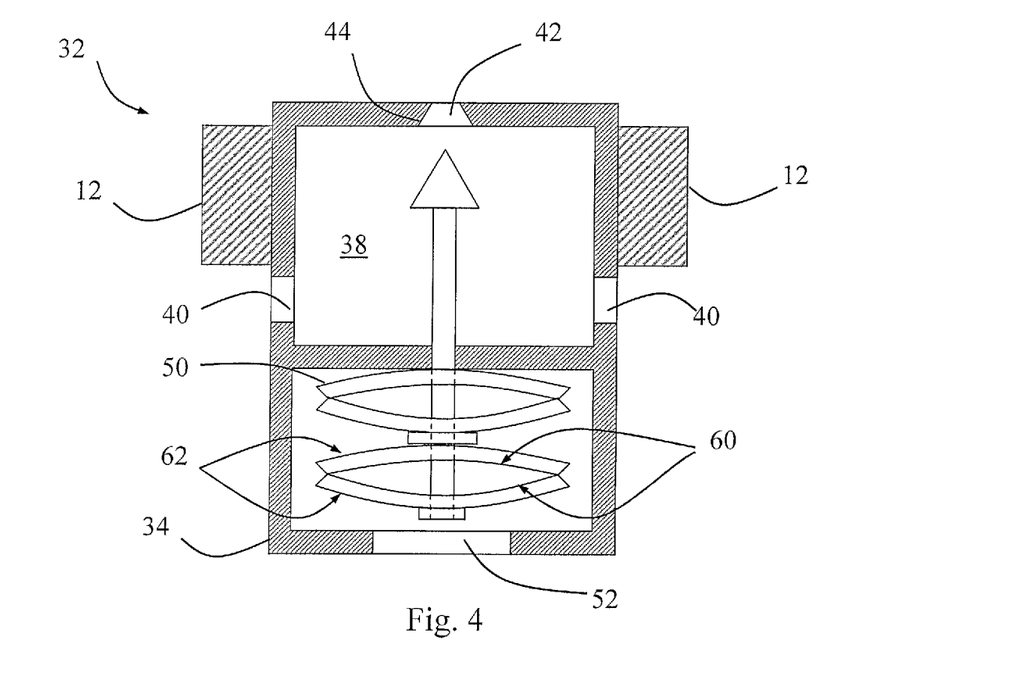
FIG. 4 provides a cross-sectional view of the embodiment illustrated in FIG. 3 in an open position in accordance with an aspect of the present subject matter.

In one embodiment, illustrated in FIGS. 3 and 4, the temperature activated thermal valve 32 is a bimetallic element valve. Such valves are commonly used in the steam industry and are shown, for example, in U.S. Pat. No. 4,427,149 (Adachi). Referring to FIG. 3 and FIG. 4, the thermal valve 32 includes a housing 34 having a top chamber 38 and a bottom chamber 36. The top chamber 38 includes outlet ports 40 and an orifice 42 defined by the valve seat 44. The bottom chamber 36 houses opposed pairs 46, 48 of bimetallic members 50 and includes an opening 52 to allow local air to enter the bottom chamber 36. A valve head 54 is attached to a valve stem 56 and is configured such that when the thermal valve 32 is in a closed position (FIG. 3) the valve head 54 is in sealing engagement with the valve seat 44.

The opposed pairs 46, 48 of bimetallic members 50 are located along the valve stem 56 in the bottom chamber 36 and may be secured thereto by any fastening mechanism 58 generally known to those of ordinary skill in the art. The inner opposed sides 60 of each pair of bimetallic members 50 have coefficients of thermal expansion which are less than the coefficients of thermal expansion of the outer sides 62 such that the members 50 will have one arrangement when exposed to temperatures below a certain temperature threshold and will assume a second arrangement when heated to or beyond such temperature threshold. More specifically, the opposed pairs 46, 48 may be configured such that the bimetallic members 50 activate from a generally horizontal arrangement to arcuate shapes as the temperature of the air within the bottom chamber 36 reaches or extends beyond the predetermined temperature threshold, with the members 50 of each pair 46, 48 disposed with the arced sides facing each other.

As a result of this configuration, the valve head 54 pulls away from the valve seat 44 to an open position (FIG. 4) allowing pressurized cooling air to flow through the passageway 30 (not illustrated) by flowing into the orifice 42 and through the outlet ports 40. When the local temperature at the bimetallic members 50 decreases below the predetermined temperature threshold, the thermal valve 32 returns to the closed position (FIG. 3) blocking the cooling air from flowing through the valve 32. It should be appreciated, of course, that the bimetallic members 50 can be composed of different combinations of metals, and therefore activate at different temperatures, to ensure that the thermal valve 32 activates at the desired temperature threshold.

Figure 5:
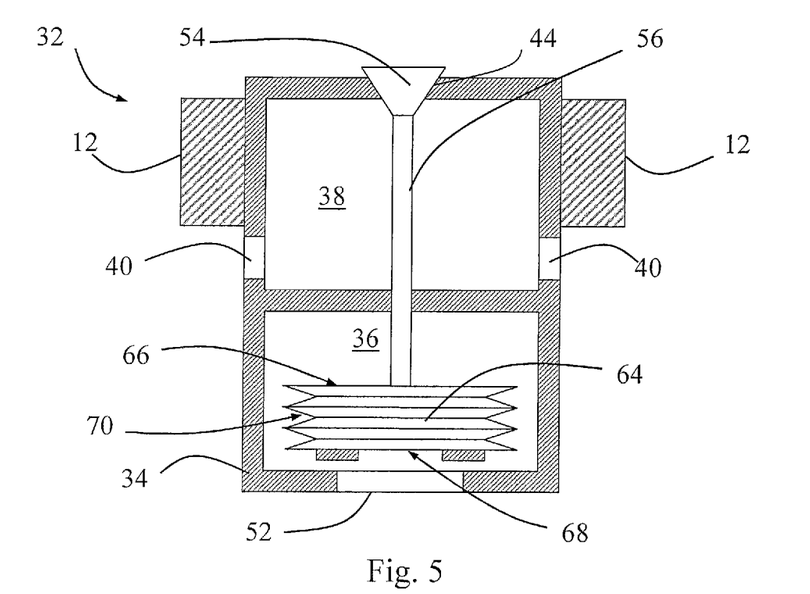
FIG. 5 provides a cross-sectional view of another embodiment of a temperature activated valve in a closed position in accordance with an aspect of the present subject matter.
Figure 6:
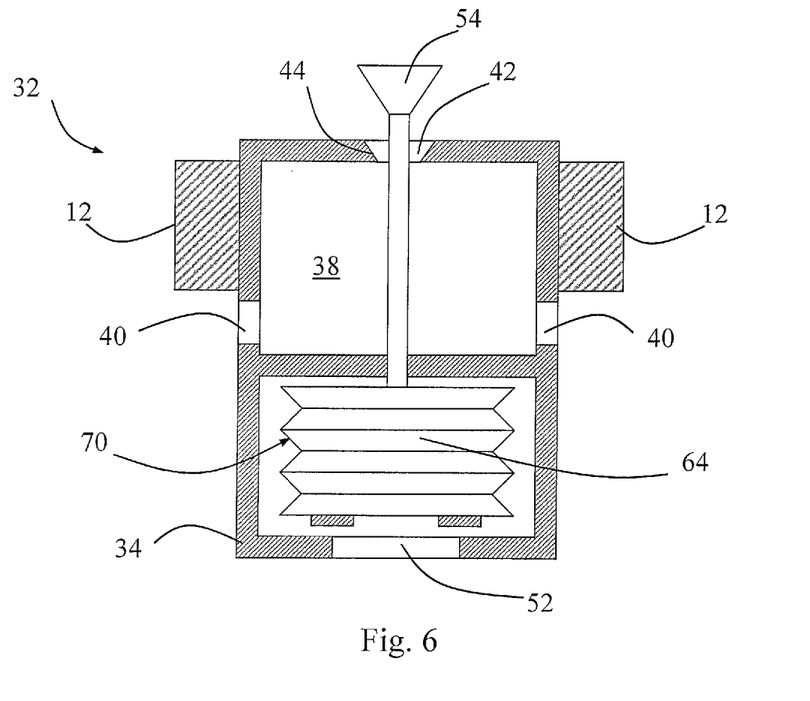
FIG. 6 provides a cross-sectional view of the embodiment illustrated in FIG. 5 in an open position in accordance with an aspect of the present subject matter.

Another embodiment of a temperature activated thermal valve 32 is shown in FIG. 5 and FIG. 6, wherein the thermal valve 32 is a liquid-filled bellow valve. Similar to the bimetallic element valve described above, liquid-filled bellow valves have been commonly used in the steam industry. Such valves are described, for example, in U.S. Pat. No. 4,560,105 (Jiandani).

Referring to FIG. 5 and FIG. 6, the thermal valve 32 includes a housing 34 having a top chamber 38 and a bottom chamber 36. The top chamber 38 includes outlet ports 40 and an orifice 42 defined by the valve seat 44. The bottom chamber 36 houses a liquid-filled bellow 64 and includes an opening 52 to allow air to enter the bottom chamber 36. A valve head 54 is attached to a valve stem 56 and is configured such when the thermal valve 32 is in a closed position (FIG. 5), the valve head 54 is in sealing engagement with the valve seat 44. The valve stem 56 is mounted to one end 66 of the bellow 64 having opposed ends 66, 68 connected by an accordion shaped side wall 70.

The bellow 64 contains a liquid whose saturation temperature corresponds to the predetermined temperature threshold such that at such temperature threshold the liquid inside the bellow 64 changes to a gaseous state causing the bellow to expand and the valve 32 to activate to an open position. As the bellow expands, the valve head 54 moves away from the valve seat 44 to an open position (FIG. 6) allowing pressurized cooling air to flow through the passageway 30 (not illustrated) by flowing into the orifice 42 and through the outlet ports 40. When the local temperature near the bellow 64 decreases below the predetermined temperature threshold, the thermal valve 32 returns to the closed position (FIG. 5) blocking the cooling air from flowing through the valve. Similar to the different combinations of metals for the bimetallic members 50 discussed above, it should be appreciated that different mixtures of liquids can be contained within the bellow 64 to ensure that the thermal valve 50 activates at the desired temperature threshold.

As indicated above, the thermal valve may be designed to normally be in a closed position (FIG. 3 and FIG. 5). Thus, when the local temperature at the thermal valve 32 is below the predetermined temperature threshold, the thermal valve remains closed and no cooling air is supplied through the thermal valve passageway 30. This could be accomplished, for example, by installing a simple biasing mechanism (not illustrated), such as a spring, into the thermal valve 32 to ensure that the valve head 54 remains in sealing engagement with the valve seat 40 when the temperature activated elements are not activated.

Moreover, it should be appreciated that the thermal valve 32 may be configured to activate to its open position either preventatively or reactively based on the local temperature at the thermal valve 32. Specifically, the thermal valve can be configured to activate preventatively to ensure that temperatures at the pressure boundary remain at acceptable levels. For example, as components within the internal wheel cavities are not designed to withstand the same temperature levels as components directly exposed to the flow of combustion products, the thermal valve 32 may activate preventatively to ensure that the components within the wheel cavities are not compromised. In contrast, the thermal valve can be configured to activate reactively in response to excessive temperatures at a pressure boundary, such as temperatures that may, if maintained, compromise turbine components.

Additionally, the thermal valve 32 may be configured to activate to an open position immediately or gradually. For example, the thermal valve 32 can be configured such that, as the local temperature reaches the predetermined temperature threshold, the thermal valve 32 activates open slightly and gradually opens to a full opened position as local temperatures continue to increase.

The thermal valve 32, as described above, can be utilized along any pressure boundary within a gas turbine. As a further example, a thermal valve passageway 30 may be located on the pressure boundary at position B (FIG. 1) into which a thermal valve 32 could be mounted. As illustrated in FIG. 1, position B is located on a pressure boundary formed along the casing that separates the inner box plenum 90 from the forward portion of the forward wheel space 28 that extends beyond the marriage joint 92. Typically, compressor discharge air bleeds from the compressor section 10 into the inner box plenum 90. A thermal valve 32 installed along this pressure boundary may be configured such that, once the temperature adjacent to position B reaches or exceeds a predetermined temperature threshold, the thermal valve 32 activates open to permit cooling air to flow from the inner box plenum 90 to the forward wheel space 28 to cool the marriage joint 92 and nearby areas.

It should also be appreciated that the temperature activated valve 32 may be oriented or otherwise configured in any way to allow high pressure, cooling air to flow into a low pressure, high temperature area and need not have the exact configuration or orientation as illustrated in FIGS. 2-6. For example, the valve 32 can be oriented such that the temperature activated elements are positioned on the higher pressure, lower temperature side of the pressure boundary. For instance, in the illustrated embodiment, the orientation of the valve could be reversed such that the temperature activated elements are positioned one the plenum 24 side of the pressure boundary formed by the compressor discharge case 12. In such an embodiment, the temperature activated elements of the valve 32 may be located within a valve housing (not illustrated) mounted on the compressor discharge case 12. The valve housing may be connected to the forward wheel space by an opening (not illustrated) formed through the compressor discharge case 12 that allows hot air from the forward wheel space to enter the housing and activate the valve 32. Once the valve 32 activates open, cooling air from the compressor 10 may flow through a separate opening or passageway to the forward wheel space 28 to quench high temperatures.

Turning to another aspect of the present subject matter, the overheating of components within the turbine section 18 of a gas turbine is often caused by hot gas ingestion. This is generally due to the fact that the hot combustion gases leaving the combustion section 10 and flowing through the turbine section 18 are at a higher pressure than the pressure within internal turbine wheel cavities, such as the forward wheel space 28. This pressure differential causes ingestion of the hot gases into turbine wheel cavities, frequently resulting in temperatures exceeding the acceptable operating ranges for turbine components.

Figure 7:
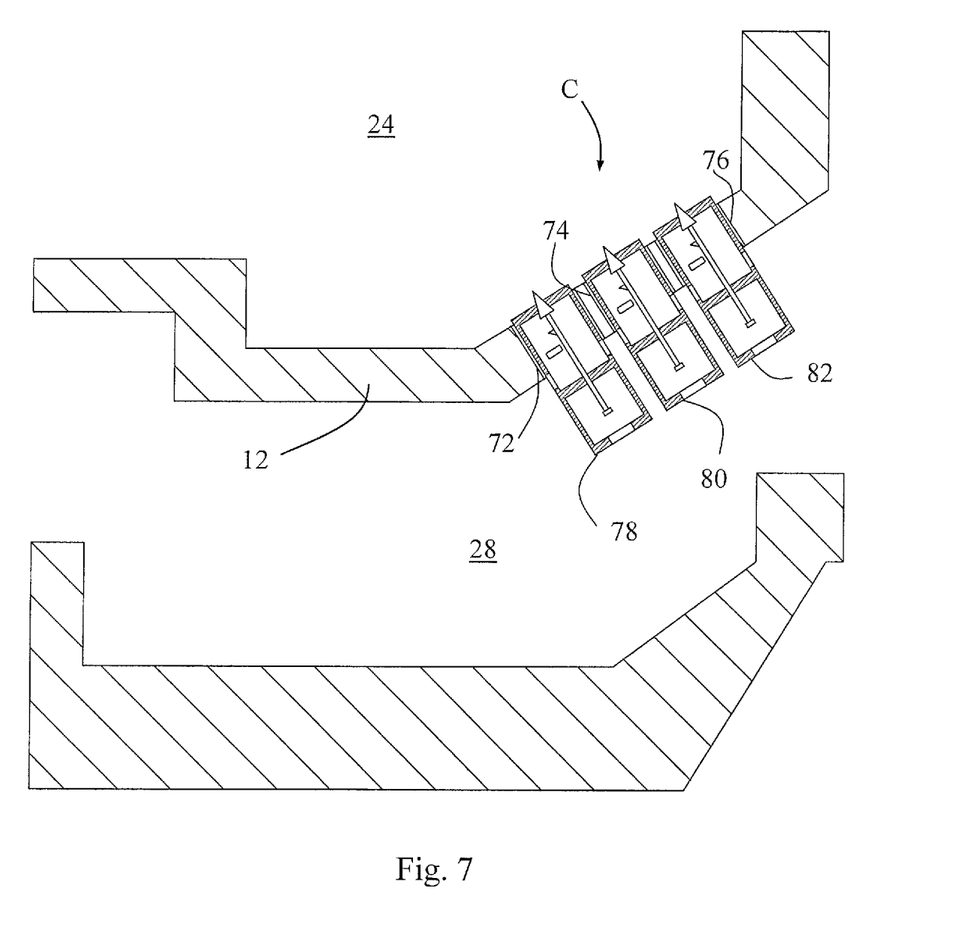
FIG. 7 provides a cross-sectional view of another embodiment of a system for modulating the amount of air flowing through a pressure boundary in accordance with an aspect of the present subject matter.

Thus, in accordance with an aspect of the present subject matter, FIG. 7 illustrates an embodiment of a system for modulating the amount of anti-ingestion air supplied through a pressure boundary in a gas turbine. The system includes a plurality of anti-ingestion valve passageways 72, 74, 76 located on a pressure boundary in a gas turbine. As illustrated, the passageways 72, 74, 76 are located at position C (FIG. 1) on the pressure boundary defined by the compressor discharge case 12. It should be appreciated, however, that the passageways 72, 74, 76 may be located at any point along such pressure boundary or on any other pressure boundary within a gas turbine. Additionally, it should be readily appreciated that a lesser or greater amount of passageways than is illustrated in FIG. 7 could be utilized in the present system.

The system also includes a plurality of temperature activated anti-ingestion valves 78, 80, 82 mounted within the passageways 72, 74, 76. The anti-ingestion valves 78, 80, 82 can be mounted within the passageway 72, 74, 76 by any method. For example, the anti-ingestion valve 78 may be press-fit into the passageway 72 or both the anti-ingestion valve 78 and the passageway 72 can be threaded to allow the anti-ingestion valve 78 to be mounted within the passageway 72.

As will be discussed below, the anti-ingestion valves 78, 80, 82 may be initially in a closed position and can be configured to permanently activate to an open position at increasing predetermined temperature thresholds based on the local temperature at the anti-ingestion valves 78, 80, 82. Once open, the anti-ingestion valves 78, 80, 82 provide a constant flow of anti-ingestion air through the passageways 72, 74, 76. Thus, in the illustrated embodiment, the anti-ingestion valves 78, 80, 82 may activate to an open position when the temperature within the forward wheel space 28, near position C, reaches or exceeds certain increasing temperature thresholds.

This would permit anti-ingestion air to continuously flow into the forward wheel space 28. As a result, the pressure inside the forward wheel space 28 rises, thereby decreasing the amount of hot gas ingestion into the wheel cavity. It should be appreciated, however, that the anti-ingestion air, in addition to being used to increase the pressure within an internal wheel cavity, can also be used as cooling air for turbine components.

The temperature activated anti-ingestion valves 78, 80, 82 may be configured to permanently activate open. In other words, in such an embodiment, once an anti-ingestion valve activates open at a certain temperature threshold, it will remain in an open position to allow a constant flow of anti-ingestion air through the pressure boundary.

Figure 8:
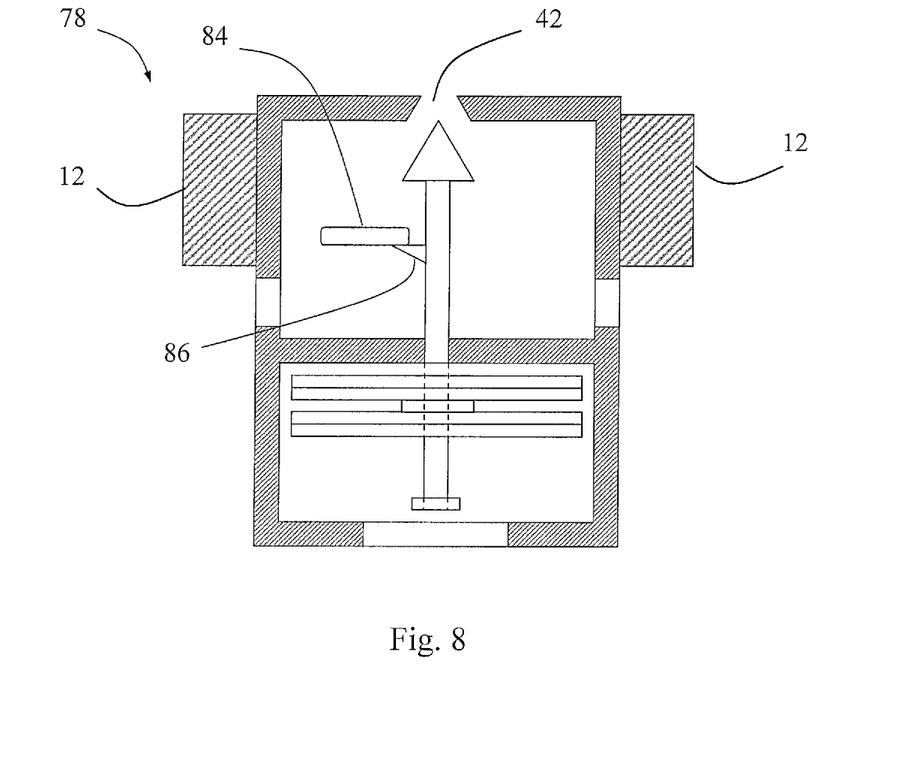
FIG. 8 provides a cross-sectional view of an embodiment of a temperature activated valve in a permanently open position in accordance with an aspect of the present subject matter.

FIG. 8 illustrates one embodiment of an anti-ingestion valve 78. As illustrated, the anti-ingestion valve 78 is a bimetallic element valve, as was described in detail above. The anti-ingestion valve 78 also includes, however, a locking mechanism 84 that prevents the valve 78 from reclosing at temperatures below its corresponding predetermined temperature threshold. The locking mechanism 84 may comprise, for example, a spring loaded member that would allow a corresponding protrusion 86, attached to the valve stem 56, to pass as the valve 78 moves into an open position, but would prevent such protrusion 86 from passing as the local temperatures around the valve 78 cooled. It should be appreciated, however, that the locking mechanism 78 may have any configuration that would prevent the anti-ingestion valve 78 from reclosing once local temperatures at the pressure boundary cool below a particular predetermined temperature threshold. Moreover, it should be appreciated that the anti-ingestion valves 78, 80, 82 need not be bimetallic element valves, but could be any type of temperature activated valve, including the liquid-filled bellow valve described above.

Similarly, the anti-ingestion valves 78, 80, 82 need not have the orientation illustrated in FIGS. 7 and 8 and may generally have any orientation that permits pressurized cooling air to flow into low pressure, higher temperature areas. For example, as described above in relation to the thermal valve 32, the anti-ingestion valves 78, 80, 82 may be oriented such that the temperature activated elements are on the high pressure, low temperature side of a pressure boundary.

In one embodiment of the present subject matter, the anti-ingestion valves 78, 80, 82 may be configured to permanently activate open at increasing predetermined temperatures. Such increasing temperatures thresholds will, of course, vary depending on numerous factors, including but not limited to the operating condition temperatures and typical engine-to-engine variations. As an example and referring to FIG. 7, anti-ingestion valve 78 may be configured to permanently activate to an open position at a predetermined temperature threshold based on anticipated operating condition temperatures and anticipated levels of hot gas ingestion within the forward wheel space 28. As temperatures within the wheel space 28 reach or exceed such temperature threshold, anti-ingestion valve 78 would permanently activate open permitting a constant flow of anti-ingestion air to enter into the wheel space 28. If local temperatures near the valves continue to rise, anti-ingestion valve 80, which can be configured to activate at a higher temperature threshold, would activate open to allow additional anti-ingestion air to flow into the wheel space 28. Similarly, anti-ingestion valve 82 may be configured to activate open at an even higher temperature threshold to enable further anti-ingestion air to flow into the wheel space 28 in the event of continued temperature elevation. It should be readily appreciated that this pattern could be extended with the installation of additional anti-ingestion valves.

Moreover, the anti-ingestion valves 78, 80, 82 may comprise orifices 42 of equal area or size to allow substantially identical amounts of anti-ingestion air to flow through the passageways 72, 74, 76 upon opening of the valves. Conversely, the anti-ingestion valves 78, 80, 82 can have orifices of differing sizes to allow a metered flow of anti-ingestion air through the passageways 72, 74, 76. For example, the anti-ingestion valves 78, 80, 82 may each have an orifice 42 of increasing size which corresponds to the increasing predetermined temperature thresholds of the anti-ingestion valves 78, 80, 82. Thus, referring to the example above, anti-ingestion valve 78, configured to activate at the lowest temperature threshold, may have the smallest orifice size, with anti-ingestion valve 80 have a larger orifice size and anti-ingestion valve 82 having an even larger orifice size. Similarly, the anti-ingestion valves 78, 80, 82 could each have an orifice 42 of decreasing size which corresponds to the increasing predetermined temperature thresholds. In such an embodiment, the valve configured to activate at the lowest temperature threshold would have the largest orifice size, with subsequent, higher temperature threshold valves having smaller orifice sizes.

Still further, the anti-ingestion valves 78, 80, 82 can be located adjacent to one another along a particular pressure boundary, as is generally illustrated in FIG. 7, or they may be spaced significantly apart on a pressure boundary. For example, anti-ingestion valve 78 may be located at position A (FIG. 1), while anti-ingestion valves 80 and 82 remain located at position C. Moreover, it should be appreciated that the anti-ingestion valves 78, 80, 82, similar to the thermal valve 32 discussed above, can be configured to activate to an open position either preventatively or reactively depending on the particular function of each valve.

Figure 9:
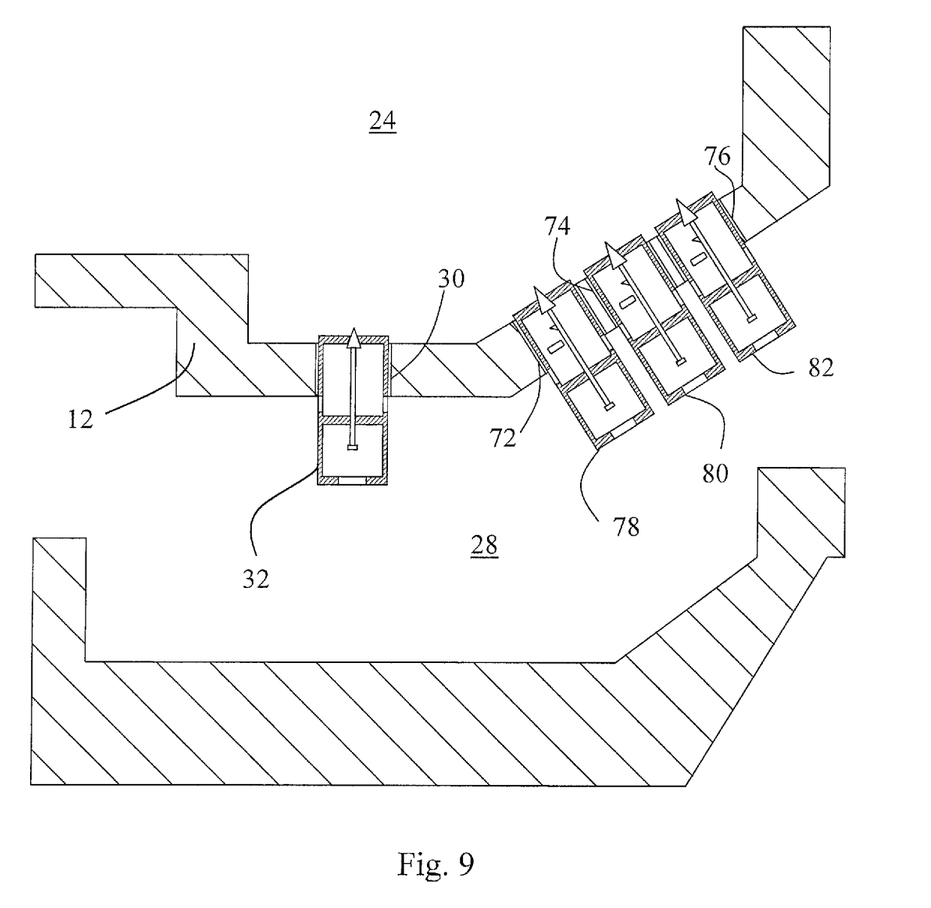
FIG. 9 provides a cross-sectional view of an embodiment of a system for modulating both the amount of cooling air and the amount of anti-ingestion air flowing through a pressure boundary in accordance with an aspect of the present subject matter.

The present subject matter also encompasses a system for modulating both the amount of cooling air and the amount of anti-ingestion air supplied through a pressure boundary in gas turbine. The system includes at least one thermal valve passageway 30 and at least one temperature activated thermal valve 32, both of which may be configured, designed, or otherwise adapted as illustrated herein and described above. The system also includes a plurality of anti-ingestion valve passageways 72, 74, 76 and a plurality of temperature activated anti-ingestion valves 78, 80, 82, both of which may also be configured, designed, or otherwise adapted as illustrated herein and described above. As shown in FIG. 9, the system is installed on the pressure boundary defined by the compressor discharge case 12 to allow both cooling and anti-ingestion air to flow into the forward wheel space 28. However, it should be appreciated that the system could be installed on any pressure boundary within a gas turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for modulating the amount of air supplied through a pressure boundary in a gas turbine, the system comprising:
    a passageway located on a pressure boundary in a gas turbine;
    a temperature activated valve configured to activate at a predetermined temperature threshold, said temperature activated valve including a housing mounted directly within said passageway, said housing including a first chamber and a second chamber separated from said first chamber; and
    wherein said temperature activated valve activates from a closed position to an open position when a local temperature at said temperature activated valve reaches or exceeds said predetermined temperature threshold to allow air to flow through said passageway.

2. The system of claim 1, further comprising a plurality of passageways and a plurality of temperature activated valves, wherein each temperature activated value of said plurality of temperature activated valves is mounted within one of said plurality of passageways.

3. The system of claim 2, wherein said plurality of temperature activated valves comprises a first temperature activated valve and a second temperature activated valve, said first temperature activated valve being configured to activate from a closed position to an open position at a first temperature threshold, said second temperature activated valve being configured to activate from a closed position to an open position at a second temperate threshold, said second temperature threshold being higher than said first temperature threshold.

4. The system of claim 1, wherein said first chamber defines an inlet orifice and at least one outlet port.

5. The system of claim 4, wherein said temperature activated valve further comprises an activation device disposed in said second chamber and a valve stem coupled to the activation device, said valve stem extending from said second chamber to said first chamber, said temperature activated valve further comprising a valve head coupled to said valve stem, said valve head being moved relative to said inlet orifice when said valve stem is activated by said activation device.

6. The system of claim 5, wherein said activation device comprises a pair of bimetallic members or a liquid-filled below.

7. The system of claim 1, wherein said temperature activated valve comprises a valve head configured to be spaced apart from an inlet orifice when said temperature activated valve is in said open position, said temperature activated valve further comprising a locking mechanism configured to lock said temperature activated valve such that said valve head is maintained spaced apart from said inlet orifice even when said local temperature falls below said predetermined temperature threshold.

8. The system of claim 7, wherein said temperature activated valve further comprises a valve stem extending from said valve head, said locking mechanism being configured to engage a protrusion extending from said valve stem in order to lock said temperature activated valve.

9. A system for modulating the amount of air supplied through a pressure boundary in a gas turbine, the system comprising:
    a plurality of passageways located on said pressure boundary, said plurality of passageways including a first passageway and a second passageway;
    a plurality of temperature activated valves configured to activate at increasing predetermined temperature thresholds, said plurality of temperature activated valves including a first temperature activated valve mounted within said first passageway and a second temperature activated valve mounted within said second passageway, said first temperature activated valve being configured to activate from a closed position to an open position at a first temperature threshold, said second temperature activated valve being configured to activate from a closed position to an open position at a second temperature threshold,
wherein said second temperature threshold is higher than said first temperature threshold.

10. The system of claim 9, wherein said pressure boundary is located axially forward of a turbine section of said gas turbine.

11. The system of claim 9, wherein said first temperature activated valve comprises a housing mounted directly within said first passageway.

12. The system of claim 11, wherein said housing includes a first chamber and a second chamber, said first chamber being separated from said second chamber.

13. The system of claim 12, wherein said first chamber defines an inlet orifice and at least one outlet port.

14. The system of claim 13, wherein said first temperature activated valve further comprises an activation device disposed in said second chamber and a valve stem coupled to said activation device, said valve stem extending from said second chamber to said first chamber, said first temperature activated valve further comprising a valve head coupled to said valve stem, said valve head being moved relative to said inlet orifice when said valve stem is activated by the activation device.

15. The system of claim 14, wherein said activation device comprises a pair of bimetallic members or a liquid-filled below.

16. The system of claim 9, wherein said first temperature activated valve comprises a valve head configured to be spaced apart from an inlet orifice when said first second temperature activated valve is in said open position, said first temperature activated valve further comprising a locking mechanism configured to lock said first temperature activated valve such that said valve head is maintained spaced apart from said inlet orifice even when said local temperature falls below said first temperature threshold.

17. The system of claim 16, wherein said first temperature activated valve further comprises a valve stem extending from said valve head, said locking mechanism being configured to engage a protrusion extending from said valve stem in order to lock said temperature activated valve.

18. The system of claim 9, wherein said first temperature activated valve comprises a first inlet orifice and said second temperature activated valve comprises a second inlet orifice, wherein said first inlet orifice differs in size from said second inlet orifice.

19. A system for modulating the amount of air supplied through a pressure boundary in a gas turbine, the system comprising:
a passageway located on a pressure boundary in a gas turbine, said pressure boundary being located axially forward of a first stage bucket of the gas turbine;
a temperature activated valve configured to activate at a predetermined temperature threshold, said temperature activated valve including a housing mounted directly within said passageway; and
wherein said temperature activated valve activates from a closed position to an open position when a local temperature at said temperature activated valve reaches or exceeds said predetermined temperature threshold to allow air to flow through said passageway.

* * * * *